US011445590B2

(12) United States Patent  
Simpkins et al.

(10) Patent No.: US 11,445,590 B2  
(45) Date of Patent: Sep. 13, 2022

(54) TETHERED REMOTE TIMER DEVICE

(71) Applicants: Mark Simpkins, Stillwater, OK (US); Jason Trice, Oklahoma City, OK (US); Cameron Trice, Oklahoma City, OK (US)

(72) Inventors: Mark Simpkins, Stillwater, OK (US); Jason Trice, Oklahoma City, OK (US); Cameron Trice, Oklahoma City, OK (US)

(73) Assignee: Jasco Products Company, LLC, Oklahoma City, OK (US)

( * ) Notice: Subject to any disclaimer, the term of this patent is extended or adjusted under 35 U.S.C. 154(b) by 0 days.

(21) Appl. No.: 17/020,909

(22) Filed: Sep. 15, 2020

(65) Prior Publication Data

US 2022/0086993 A1 Mar. 17, 2022

(51) Int. Cl.
| | |
|---|---|
| *H05B 47/16* | (2020.01) |
| *H05B 47/19* | (2020.01) |
| *H05B 47/165* | (2020.01) |
| *G06F 3/02* | (2006.01) |

(52) U.S. Cl.
CPC ........... *H05B 47/16* (2020.01); *H05B 47/165* (2020.01); *H05B 47/19* (2020.01); *G06F 3/02* (2013.01)

(58) Field of Classification Search
CPC ...... H05B 47/16; H05B 47/19; H05B 47/165; G06F 3/02
See application file for complete search history.

(56) References Cited

U.S. PATENT DOCUMENTS

| 6,472,831 | B1* | 10/2002 | Russo | H05B 47/16 |
| | | | | 315/71 |
| 7,956,496 | B1* | 6/2011 | Pasley | H01H 43/04 |
| | | | | 307/141 |
| 2005/0013196 | A1* | 1/2005 | Russo | G04G 15/00 |
| | | | | 368/10 |
| 2007/0217290 | A1* | 9/2007 | Rock | H05B 47/16 |
| | | | | 368/12 |
| 2009/0206769 | A1* | 8/2009 | Biery | H05B 47/10 |
| | | | | 315/158 |
| 2011/0211425 | A1* | 9/2011 | Liu | G04G 15/006 |
| | | | | 368/10 |
| 2014/0034798 | A1* | 2/2014 | Lee | F16M 13/022 |
| | | | | 248/295.11 |
| 2017/0188442 | A1* | 6/2017 | King | H05B 47/16 |
| 2018/0063930 | A1* | 3/2018 | Trice | H05B 47/19 |
| 2018/0363863 | A1* | 12/2018 | York | F21V 17/12 |

* cited by examiner

*Primary Examiner* — Raymond R Chai  
(74) *Attorney, Agent, or Firm* — William Popejoy

(57) ABSTRACT

The present invention discloses tethered remote timer devices and applications for the control of residential lighting. More specifically, the invention pertains to a tethered remote timer comprising a pushbutton within the remote housing that allows the control of the state of connected lighting via an integrated timer and the brightness level of the lighting via a remotely accessible control. The remotely accessible control can also be used to override the timing device thereby changing the state of the connected lighting. The pushbutton provides the user the ability to increase or decrease light intensity within a programmable lighting schedule. In some embodiments, the tethered remote comprises: at least one preset countdown button which corresponds to a different preset or user set program, controls more than one load, communicates wirelessly, and turns on USB or USB-C output to control DC powered lighting.

20 Claims, 9 Drawing Sheets

TETHERED REMOTE TIMER DEVICE

BACKGROUND OF THE INVENTION

1. Field of the Invention

The present invention pertains to devices and applications for the control of residential lighting. More specifically, the invention pertains to a device or devices that allow the control of the state of connected lighting via an integrated timer and the brightness level of the lighting via a remotely accessible control. The remotely accessible control can also be used to override the timing device thereby changing the state of the connected lighting.

2. Description of the Related Art

Residential plug-in timers have historically had limitations that inhibit the optimal customer experience. These timers plug directly into an electrical receptacle mounted into the wall. Because the controls for these timers are on the timer front face it is impractical for the customer to override the timer programming. Additionally, timers typically employ a relay to apply full AC line voltage to lighting at the prescribed time, thus giving no control over the brightness of the connected lighting.

SUMMARY OF THE INVENTION

Control of residential lighting, as in relation to lighting facilities of the present invention, may be defined as the ability to regulate the intensity level, color temperature, and quality of light in a residential space for specific functions, moods, or situations. The proper control of residential lighting enhances the experience and saves energy by using light when and where it is desired. Further, the control of residential lighting may not just be limited to the control of light in a single room or area, but the light or lights in an entire home or building may be controlled by a single remote.

Embodiments described for the present invention use a tethered remote comprising a pushbutton to select a preferred brightness level of a connected lighting device via an integrated timer. The pushbutton provides the user the ability to increase or decrease light intensity within a programmable lighting schedule, and may change the state of the connected lighting device to on or off.

In some embodiments, the tethered remote comprises at least one preset countdown button which corresponds to a different preset or user set program. The tethered remote may have multiple pushbuttons and one or more led indicators where the user can select a program then adjust the setting of the program. In some embodiments, the tethered remote may have pushbuttons where one pushbutton selects a separate load or output, and another button determines the start of a preset or user set program for the output. In this embodiment, the timer has more than one output to control more than one load.

In another embodiment of the invention, the tethered remote communicates wirelessly with other connected home devices to set a dimming level or run a preset countdown or other preset timer setting. In another embodiment, the tethered remote with an integrated housing comprises USB or USB-C connections. The tethered remote may turn on USB or USB-C output to control DC powered lighting.

It should be appreciated that combinations of the foregoing concepts and additional concepts discussed in greater detail below are contemplated as being part of the inventive subject matter disclosed herein. In particular, all combinations of claimed subject matter appearing at the end of this disclosure, or elsewhere herein, are contemplated as being part of the inventive subject matter.

These and other systems, methods, objects, features, and advantages of the present invention will be apparent to those skilled in the art from the following detailed description of the preferred embodiment and the drawings.

BRIEF DESCRIPTION OF THE DRAWINGS

One or more embodiments are illustrated by way of example, and not by limitation, reference will now be made to the accompanying drawings, having the same numeral designations to represent like elements throughout and wherein.

Figure 1:
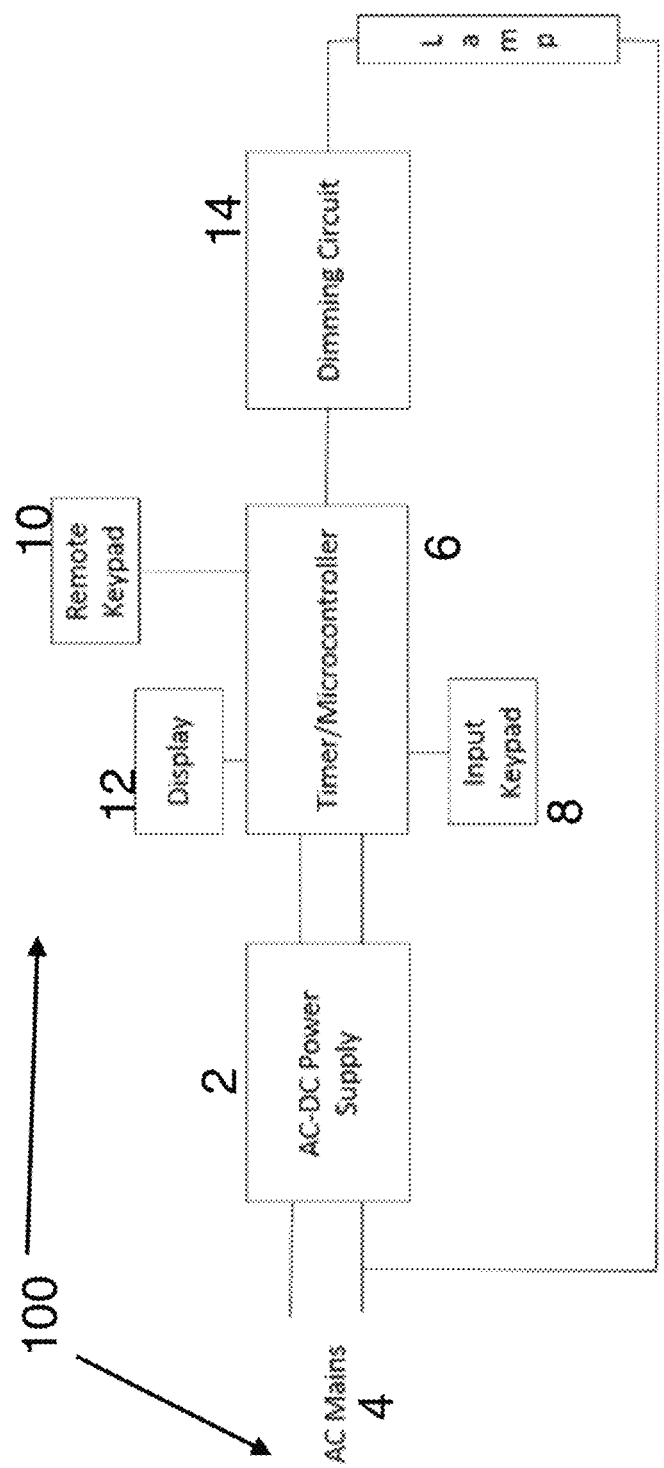
FIG. 1 shows a block diagram of an embodiment of a tethered remote timer device.

While the invention has been described in connection with certain preferred embodiments, other embodiments would be understood by one of ordinary skill in the art and are encompassed herein.

Elements with Corresponding Reference Numerals

Tethered remote timer device 100
AC-DC power supply 2
AC mains 4
Microcontroller 6
Input keypad 8
Tethered remote 10
Display 12
Dimming circuitry 14
Pushbutton 16
Housing of an integrated timer 18
Front face of the remote housing 20
Rear face of the remote housing 22

Tether 28
Timer 30
Front face of the timer housing 34
Indicator lights 36
Electrical prongs 38
Rear face of the timer housing 40
Display opening 44
Electrical outlet on the left side of the timer housing 421
Electrical outlet on the right side of the timer housing 422
Tether timer attachment 46
Tether remote attachment 48
Keyhole 50
Pushbuttons 52
Preset countdown button 54
LED indicators 56

DETAIL DESCRIPTION OF THE INVENTION

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation. Moreover, it is to be appreciated that the drawings may not be to scale.

FIG. 1 is a block diagram of an exemplary tethered remote timer device 100. The tethered remote timer device 100 may include a variety of additional components. An AC-DC power supply 2 is electrically connected to AC mains 4. The AC-DC power supply 2 converts alternating current supplied by the power grid into direct current in order to power the tethered remote timer device 100. The AC-DC power supply 2 delivers direct current via an electrical connection to a microcontroller 6. The microcontroller 6 is embedded within the tethered remote timer device 100 and controls the actions and functions by receiving inputs from different components of the device and sending signals to different parts of the device.

An input keypad 8, electrically connected to the microcontroller 6, is utilized for user selection of different lighting control and programming options. The input keypad 8 may be comprised of any number or type of buttons. A tethered remote 10, electrically connected to the microcontroller 6, sends input to the microcontroller 6, provides user selection of lighting options. A display 12, electrically connected to the microcontroller 6, receives signals from the microcontroller 6 and makes a prominent exhibition of various information in a location on the tethered remote timer device 100 where it can readily be seen.

Dimming circuitry 14 is electrically connected to the microcontroller 6, receives input from the microcontroller 6, and alters the voltage applied to a lamp. The change in voltage provides the user the ability to select a preferred brightness level of the lamp or lamps.

Figures 2, 3:
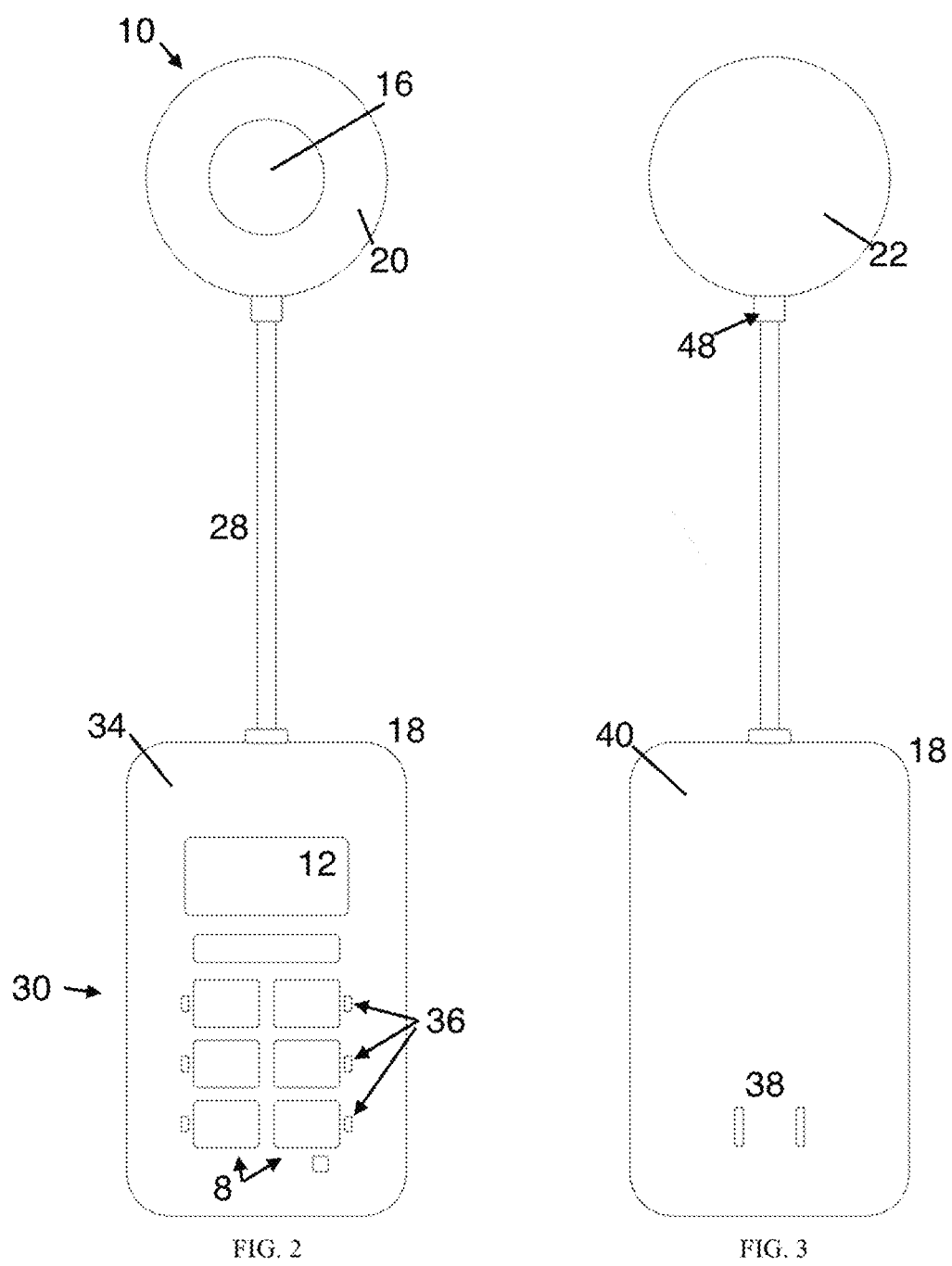
FIG. 2 shows a front elevational view of an embodiment of a tethered remote timer device.
FIG. 3 shows a rear elevational view of an embodiment of a tethered remote timer device.

FIG. 2 shows a front elevational view of an embodiment of a tethered remote timer device 100. The tethered remote 10 is comprised of a pushbutton 16, which communicates with a microcontroller 6 (not shown) within a housing of an integrated timer 18 to select a preferred brightness level of at least one connected device. Another embodiment, understood by one of ordinary skill in the art and encompassed herein, may replace the pushbutton 16 with any circuit which generates a momentary signal, such as a momentary pushbutton or capacitive touch pad.

The remote may vary in structure and composition. As in FIG. 2, one embodiment of the present invention details a circular remote with a single pushbutton 16 extending through the front face of the remote housing 20. The circular remote provides an aesthetically pleasing design and space saving option. As in FIG. 3, the rear face of the remote housing 22 may be flat to allow the remote to lay flat on a nightstand, floor, dresser, or any number of flat surfaces. The tether remote attachment 48 enters the tethered remote 10 through the housing of an integrated timer 18, and facilitates the connection of the tether 28 to the pushbutton 16.

The tether 28 in FIG. 2 may vary in length, structure, and composition. The tether 28 may be rope or cord-like in nature, providing the user numerous options for remote placement. For example, the user may move the location of the tethered remote 10 from a nightstand, to a bedroom floor, to a bedframe, or to a headboard of a bed without removing the attached timer 30 from a wall mounted electrical outlet.

Functionally, the tethered remote 10 provides the user with control of the state of the connected lighting via an integrated timer 32 and the control of the brightness level of the connected lighting device. The tethered remote 10 may regulate the intensity level, color temperature, and quality of light in a residential or commercial space for specific functions, moods, or situations. Further, the control of lighting may not be limited to the control of light in a single room or area, but the light or lights in an entire home, apartment, building, or office with a single remote. The timer 30 may utilize the tethered remote 10 to increase and decrease light intensity and control the state of at least one connected lighting device within a programmable lighting schedule. The attached timer 30 controls the state and the brightness level of at least one connected lighting device, adds convenience and customization to an area or areas with a programmable lighting schedule, and helps save on time and energy with the scheduled programming allowing lights in an area or areas to change dimness levels and turn on or off automatically.

The tethered remote 10 with a pushbutton 16 provides further convenience and customization to programmable lighting schedule, by allowing the user to adjust the dimness levels without having to press the input keypad 8 affixed to the front face of the timer housing 20. The adjusted dimness level may be saved within the programming schedule, where the chosen dimness level will automatically be selected within the corresponding period of future iterations. In an alternate embodiment, the dimness level may presently be adjusted, but future iterations of corresponding periods within the lighting schedule may default to the original dimness level selected.

As shown in the embodiment in FIG. 2, the tethered remote 10 attaches to a timer 30. A display 12 is visible through the front face of the timer housing 20. A wide variety of display technologies may be used within the present invention, including but not limited to: LED (light emitting diode), OLED (organic light emitting diode), AMOLED (active-matrix organic light emitting diode), LCD (liquid crystal display), ELD (electroluminescent display), QLED (quantum dot light emitting diode), or any other electronic visual display used for the presentation of information.

A input keypad 8 may be accessible through the front face of the timer 34. Various types of keypad technologies may be used within the present invention. For example, membrane keypads, dome-switch keypads, scissor-switch keypads, capacitive keypads, or any other keypad types may be used to input commands. Touchscreen interfaces may also be used within the present invention. The input keypad 8 may vary in size, type, and composition. Further, the input keypad 8 may include various preset buttons, countdown buttons, pushbuttons, on/off buttons, or various other button types.

As in FIG. 2, one or more indicator lights 36 may be visible through the front face of the timer housing 34. The indicator light, or lights 36, may be one or more LEDs (light emitting diodes) or any equivalent lighting types to one having ordinary skill in the art. The indicator lights 36 may vary in location, size, and structure.

The embodiment shown in FIG. 3 discloses electrical prongs 38 extending through the rear face of the timer housing 40. The extended electrical prongs 38 may vary in location within the housing of the integrated timer 18, and serve to electrically connect to any outlet providing AC power.

Figure 4:
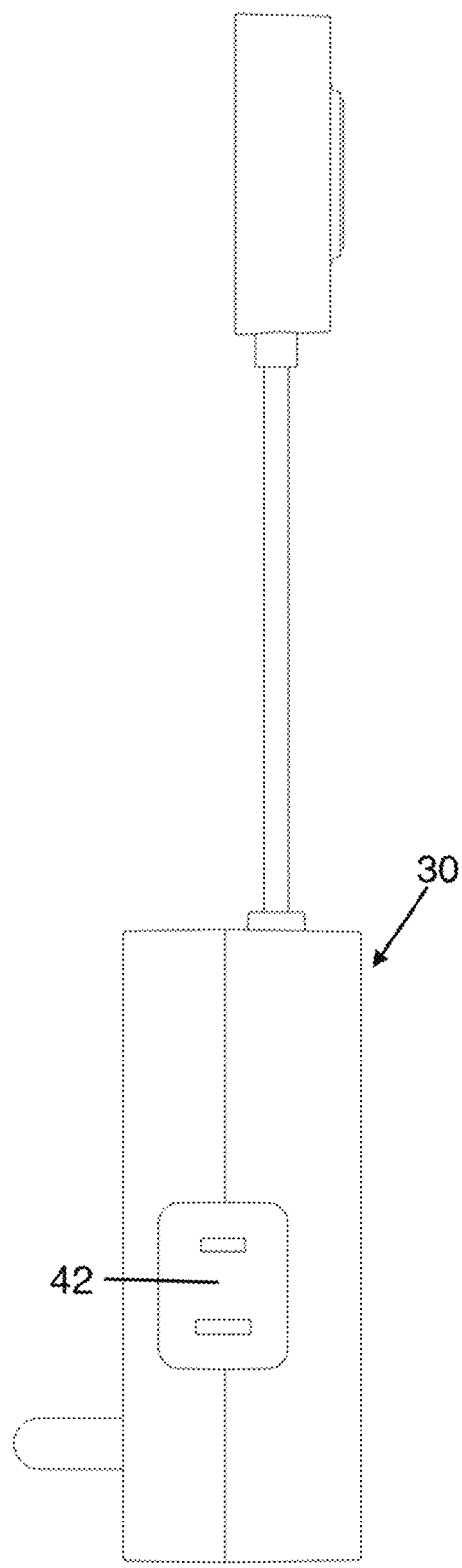
FIG. 4 shows a left side elevational view of an embodiment of a tethered remote timer device.
Figure 5:
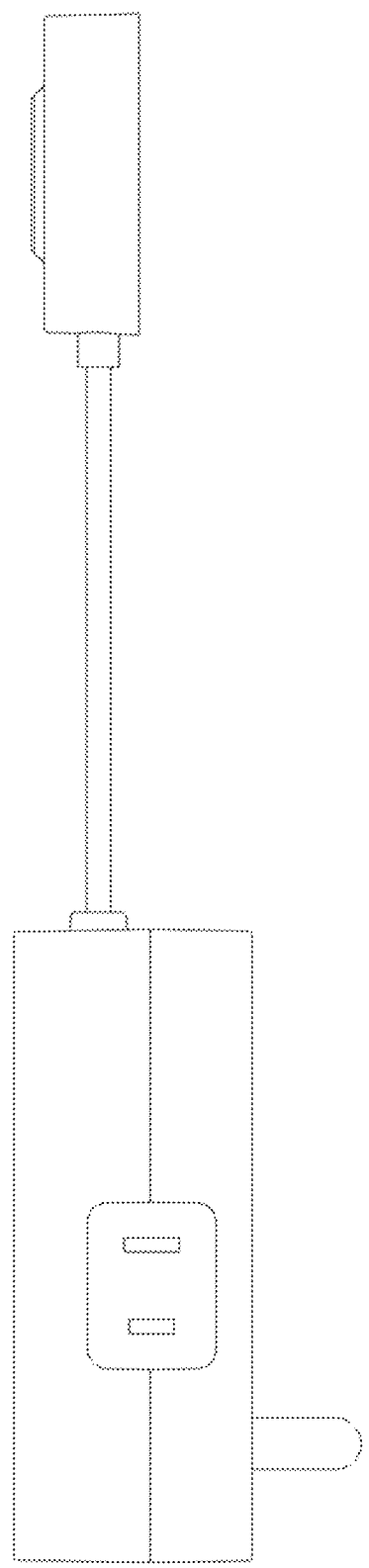
FIG. 5 shows a right side elevational view of an embodiment of a tethered remote timer device.
Figure 6:
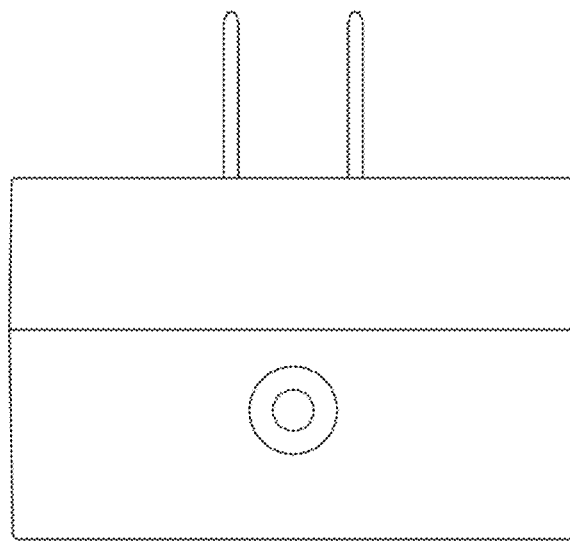
FIG. 6 shows a top sectional view of an embodiment of a tethered remote timer device.
Figure 7:
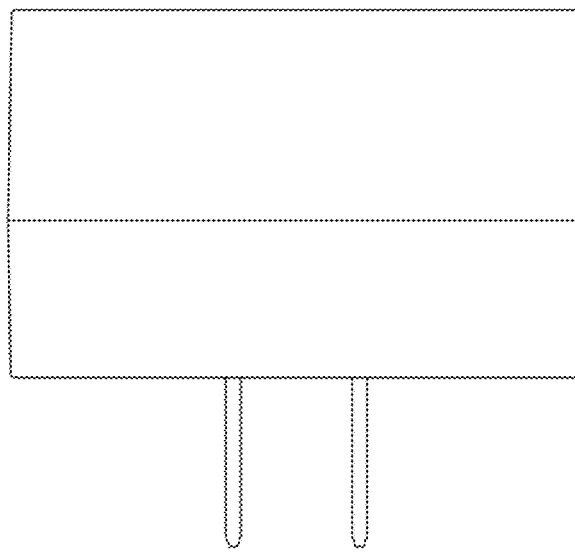
FIG. 7 shows a bottom view of an embodiment of a tethered remote timer device.
Figure 8:
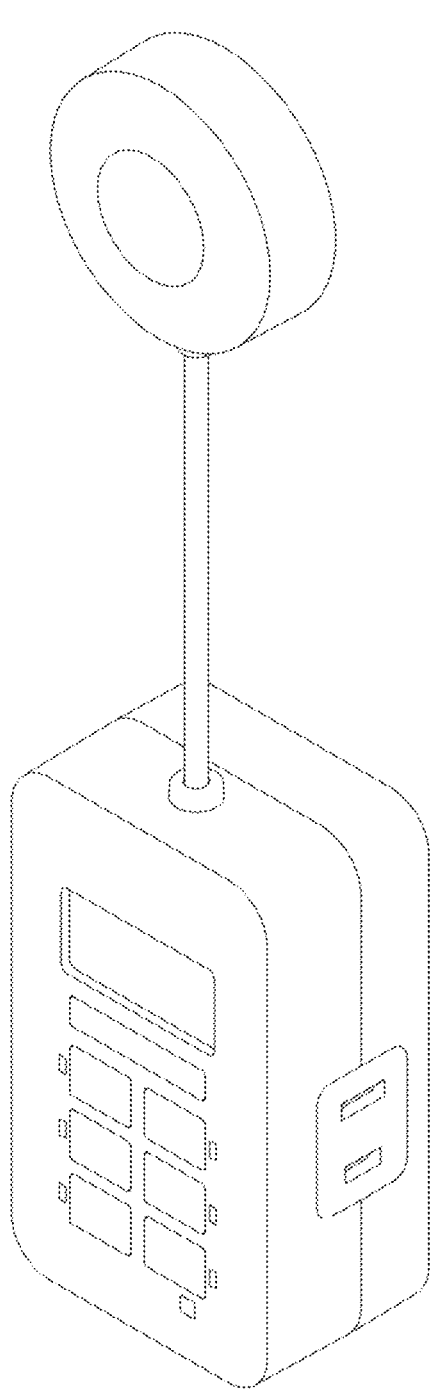
FIG. 8 shows a perspective view of an embodiment of a tethered remote timer device.
Figure 9:
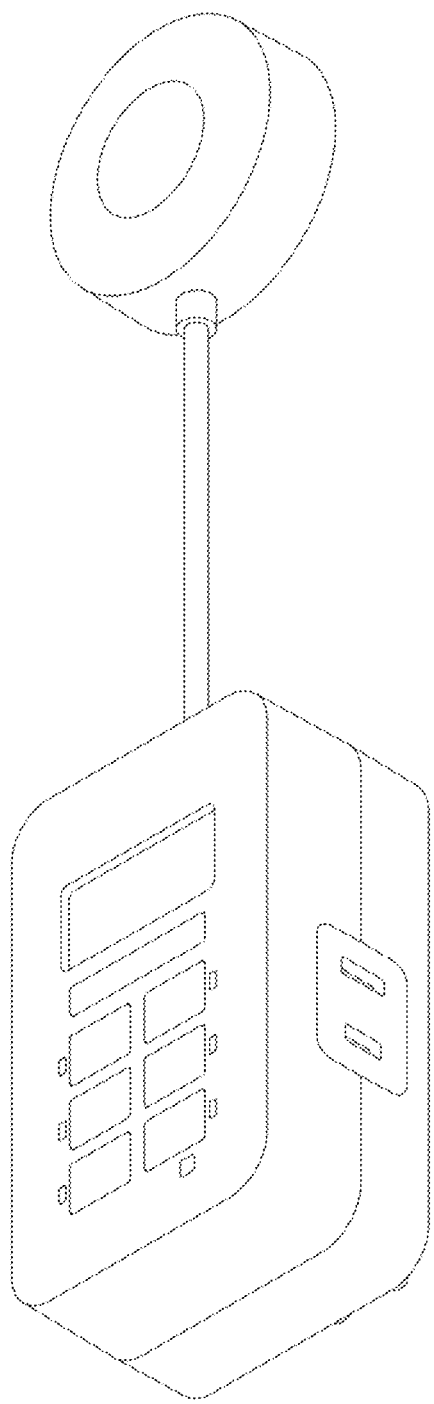
FIG. 9 shows a perspective view of an embodiment of a tethered remote timer device.

In FIG. 4, an embodiment of the present invention may have one or more electrical outlets 42. Lighting devices, and other electrical devices, may be electrically connected to the timer 30 through the electrical outlet 42. Not shown, the timer 30 may have USB or USB-C outputs to facilitate USB or USB-C connections to control DC powered lighting.

Figure 10:
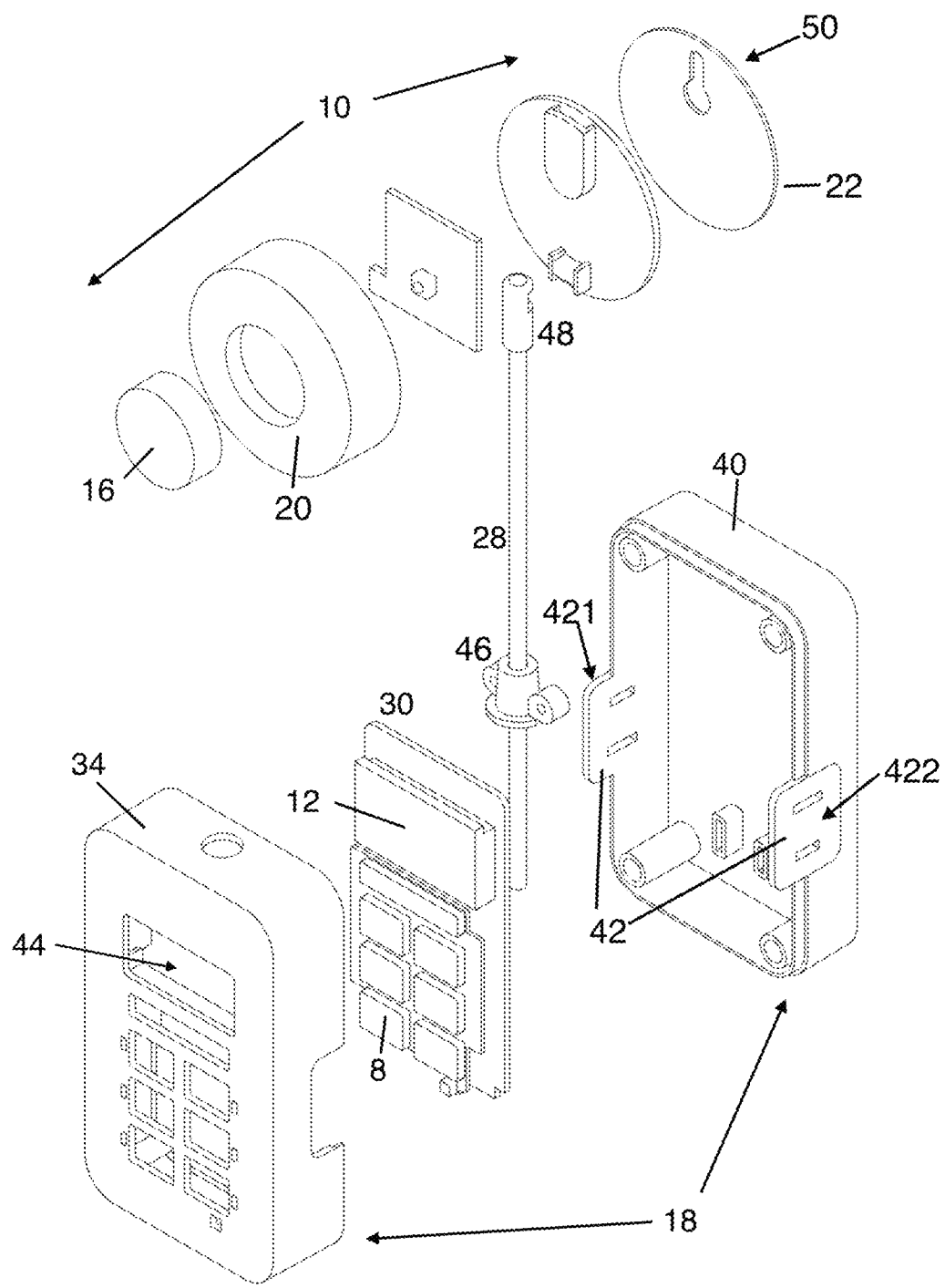
FIG. 10 shows an exploded view of an embodiment of a tethered remote timer device.

FIG. 10 illustrates an exploded view of one embodiment of the present invention. A display 12 and an input keypad 8 are visible through the front face of the timer housing 34. The display 12 may be recessed behind the display opening 44. The front face of the timer housing 34 provides physical protection for the display 12, but allows the display 12 to provide the user with setting, dimness level, timing, schedule programming, and other information.

The input keypad 8 may extend through the front face of the housing 34. The extension through the front face of the housing 34 provides the user easier access to functional control of the connected lighting device.

The rear face of the housing 40 in the present disclosure attaches to the front face of the housing 34 to create the housing of the timer 18. In FIG. 10, the rear face of the housing 40 illustrates the capability of the timer to have more than one electrical outlet 42. An electrical outlet on the left side of the timer 421 and an electrical outlet on the right side of the timer 422 allow the timer to control multiple loads. More than one lighting device may be controlled via the timer 30 in the current embodiment.

The tether 28 electrically connects the timer 30 to the tethered remote 10. The tether 28 physically attaches to the timer 30 via a tether timer attachment 46. The tether 28 physically attaches to the tethered remote 10 via a tether remote attachment 48. The tether timer attachment 46 and the tether remote attachment 48 additionally serve to protect the tether 28 upon entrance into the respective housings.

FIG. 10 provides an exploded view of the tethered remote 10. A pushbutton 16 extends through a front face of the remote housing 20. The rear face of the remote housing 22 may comprise a keyhole 50. The keyhole 50 provides the user the ability to potentially mount the tethered remote 10 onto any possible vertical surface.

Figure 11:
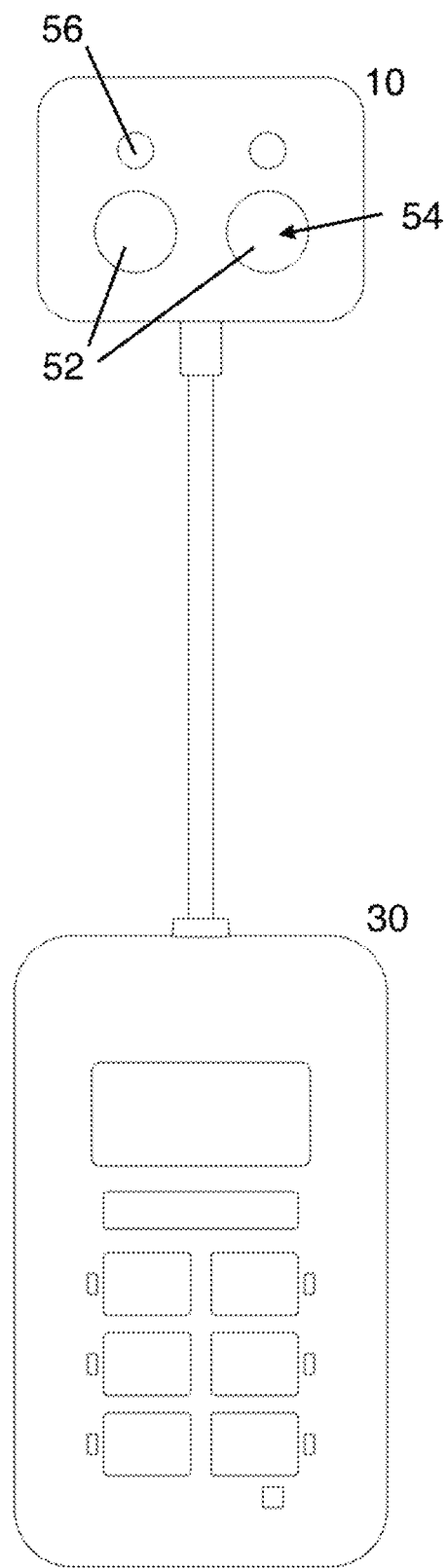
FIG. 11 shows a front elevational view of another embodiment of a tethered remote timer device.
Figure 12:
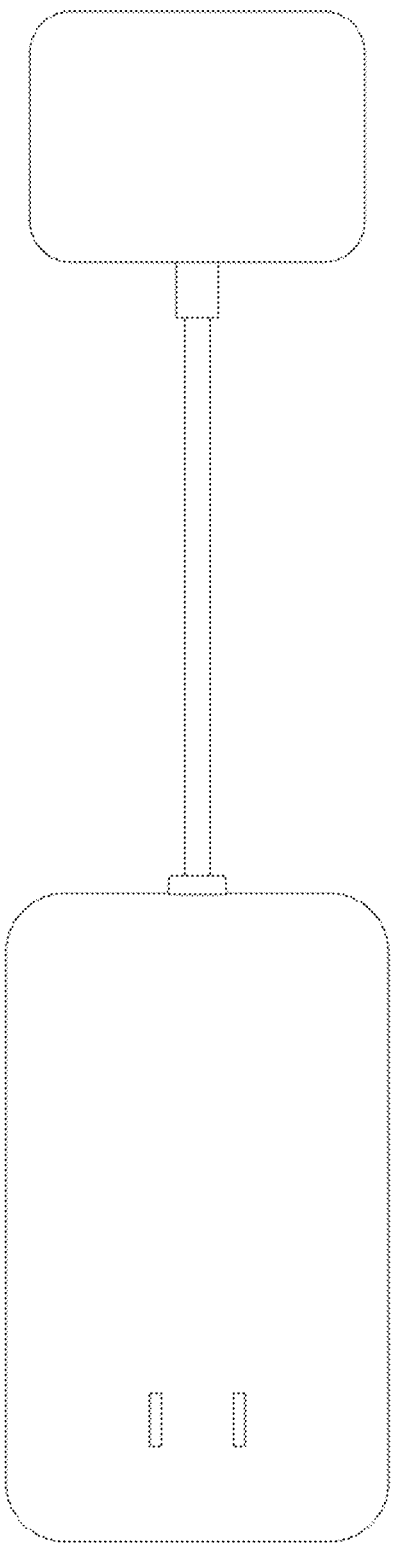
FIG. 12 shows a rear elevational view of another embodiment of a tethered remote timer device.
Figure 13:
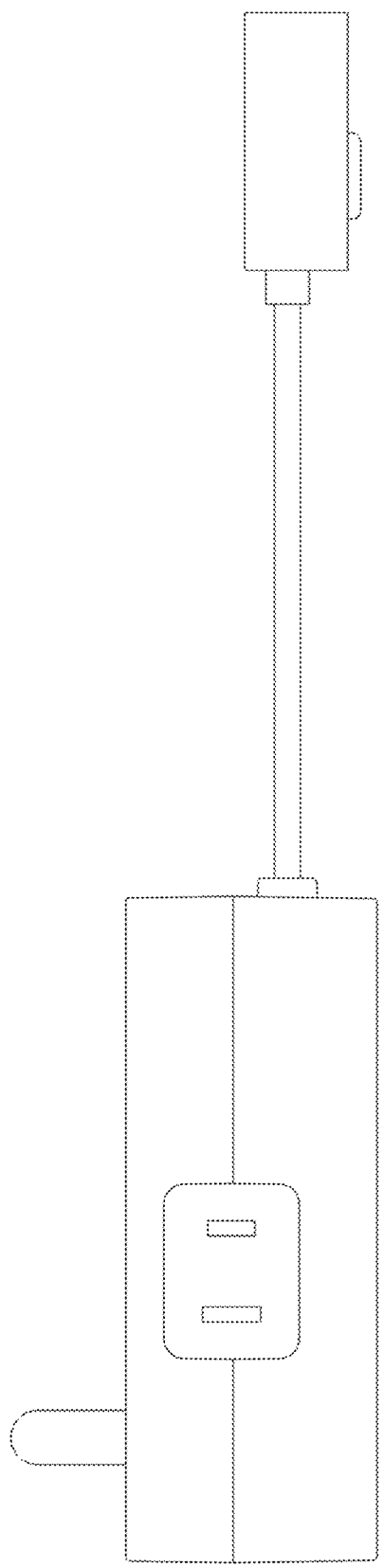
FIG. 13 shows a left side elevational view of another embodiment of a tethered remote timer device.
Figure 14:
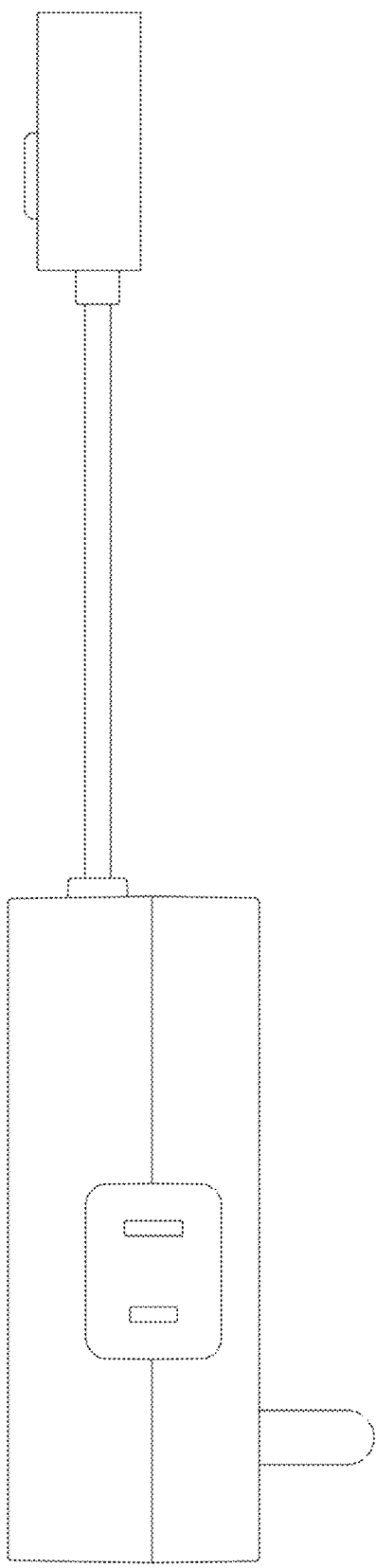
FIG. 14 shows a right side elevational view of another embodiment of a tethered remote timer device.
Figure 15:
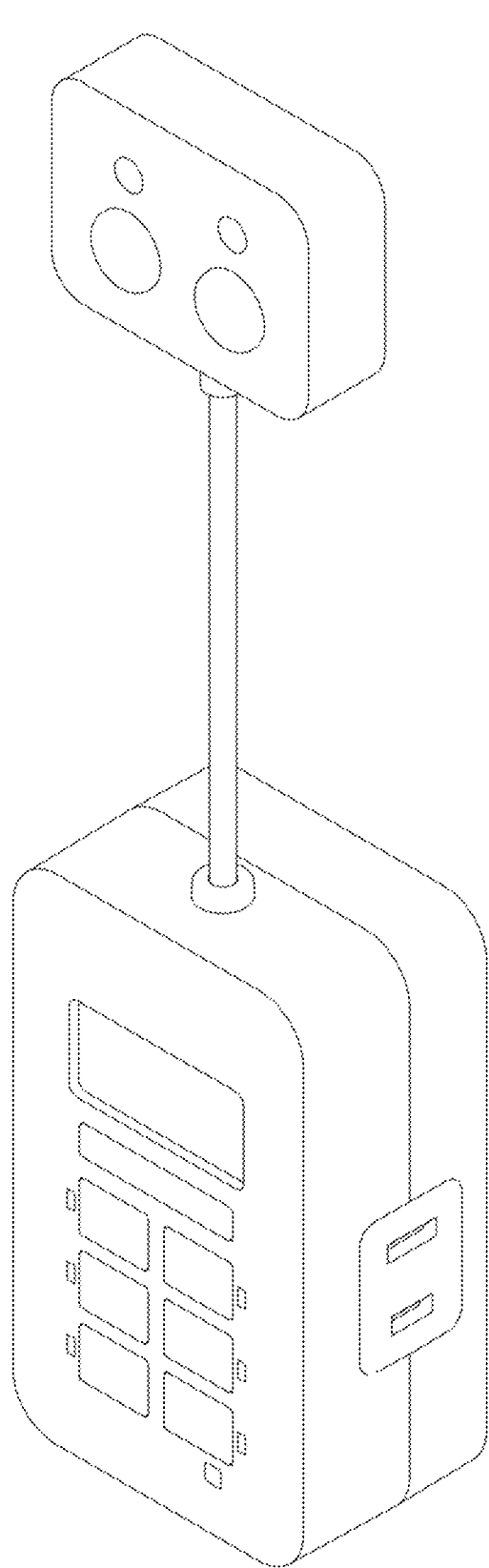
FIG. 15 shows a right perspective view of another embodiment of a tethered remote timer device.
Figure 16:
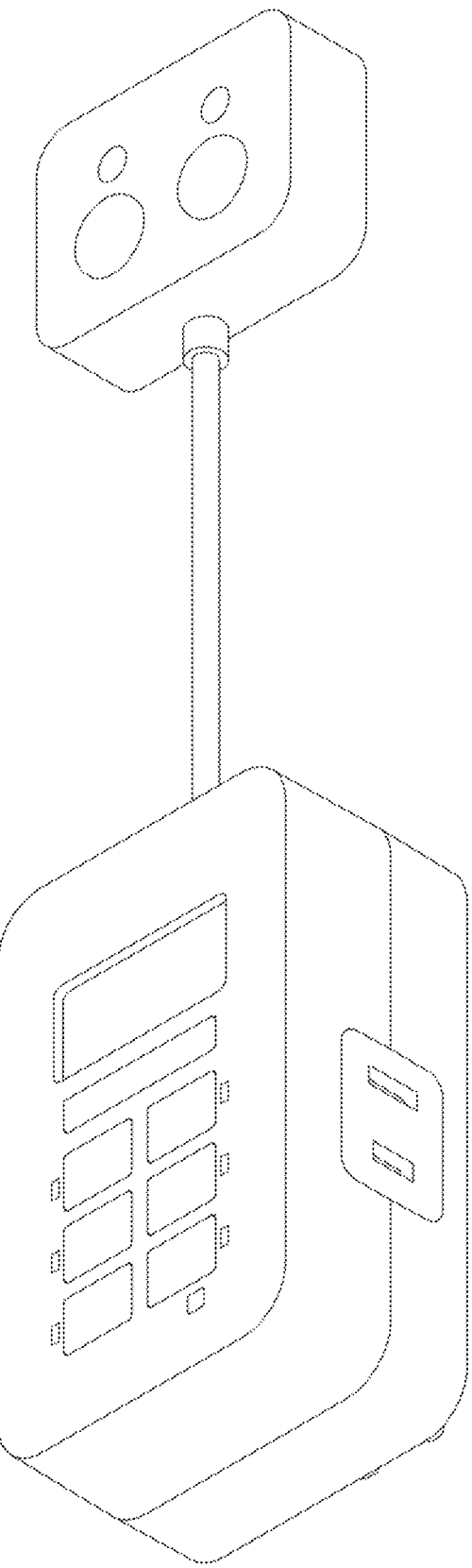
FIG. 16 shows a right perspective view of another embodiment of a tethered remote timer device.

In another embodiment shown in FIG. 11, the tethered remote 10 may comprise more than one pushbutton 52. The tethered remote 10 may comprise at least one preset countdown button 54 which corresponds to a different preset or user set program. In this embodiment, the tethered remote 10 may have one or more LED indicators 56 and multiple pushbuttons 52 where the user can select a program then adjust the setting of the program.

In one embodiment, the remote may have multiple pushbuttons 52, where one pushbutton selects a separate load or output, and another pushbutton determines the start of a preset or user set program for the output. In this embodiment, the timer 30 has more than one output to control more than one load.

In another embodiment of the invention, not shown, the tethered remote 10 communicates wirelessly with a connected lighting device or devices. The tethered remote timer 30 may wirelessly regulate the intensity level, color temperature, and quality of light in an area, or areas, residential space for specific functions, moods, or situations. The control of lighting may not just be limited to the control of light in a single room or area, but the light or lights in an entire home, apartment, building, or office with a single remote.

In another embodiment of the invention, not shown, the tethered remote timer device 100 may operate through WiFi. The WiFi capabilities of the device allows the tethered timer remote device 100 to operate as a WiFi repeater or additional node to increase connectivity in a wireless system.

In another embodiment of the invention, not shown, the tethered remote timer device 100 may comprise a tethered remote, and the tethered remote comprises one or more preset countdown pushbuttons which provide the user with different countdown timing options. The countdown timing options may be customizable. Versions of this embodiment may have one or more of the following features: programmable lighting schedule selected by the input keypad or by the tethered remote, at least one LED indicator, at least one pushbutton which selects at least one output, wireless control of lighting devices, at least one USB output, at least one USB-C output, WiFi capabilities which allow the device to operate as a WiFi repeater or additional node to increase connectivity in a wireless system.

Although the present invention has been described in relation to particular embodiments thereof, many other variations and modifications will become apparent to those skilled in the art. It is preferred, therefore, that the present invention be limited not by the specific disclosure herein, but only by the appended claims. Alternate embodiments may be devised without departing from the spirit or scope of the invention. Further, the particular feature or structure may be combined in any suitable manner in one or more embodiments.

The invention claimed is:

1. A timer device comprising:
    a timer housing;
    an AC-DC power supply which converts alternating current into direct current;
    a microcontroller;
    an integrated timer;
    an input keypad;
    a display;
    a tether devoid of alternating current, which delivers direct current from the timer housing to a tethered remote, wherein the tether may vary in length, structure, and composition;
    a tethered remote;
    a tethered remote housing;
    wherein the tethered remote receives direct current from the tether; wherein the tethered remote is devoid of alternating current, wherein the tethered remote comprises one or more preset countdown pushbuttons which provide the user with different countdown timing options;
    wherein the integrated timer may be user controlled from at least two different input locations connected physically and electrically by the tether, the two different input locations include: the input keypad located within the timer housing, and the tethered remote; wherein the tethered remote is devoid of the integrated timer or any timer; and a user may move the physical location of the tethered remote without removing the timer housing from a wall mounted electrical outlet, examples but not limitations include repositioning the tethered remote from a nightstand, to a bedroom floor, to a bed frame, to a footboard, or to a headboard of a bed.

2. The timer device as claimed in claim 1 further comprising:
a programmable lighting schedule; and
the programmable lighting schedule is selected by the input keypad.

3. The timer device as claimed in claim 1 further comprising:
at least one LED indicator; and
the tethered remote comprises a keyhole which may assist in mounting the tethered remote to a vertical surface.

4. The timer device as claimed in claim 1 further comprising:
the tethered remote comprises at least one pushbutton which independently controls more than one load to more than one output, wherein two or more electrical devices plugged into two or more outlets of the timer may be controlled independently from each other.

5. The timer device as claimed in claim 1 further comprising:
a tether timer attachment, wherein the tether timer attachment facilitates the tether physical attachment to the timer, wherein the tether timer attachment structurally protects the tether upon entrance into the timer housing; and
a tether remote attachment, wherein the tether remote attachment facilitates the tether physical attachment to the tethered remote, wherein the tether remote attachment structurally protects the tether upon entrance into the tethered remote housing.

6. The timer device as claimed in claim 1 further comprising:
at least one USB output; and
the at least one USB output may be a USB or a USB-C output.

7. The timer device as claimed in claim 1 further comprising:
wireless control of home lighting devices; and
WiFi capabilities which allows the device to operate as a WiFi repeater or additional node to increase connectivity in a wireless system.

8. A timer device comprising:
a timer housing;
an AC-DC power supply which converts alternating current into direct current;
a microcontroller;
an integrated timer;
an input keypad;
a display;
a tether devoid of alternating current, which delivers direct current from the timer housing to a tethered remote, wherein the tether may vary in length, structure, and composition;
a tethered remote;
a tethered remote housing;
wherein the tethered remote receives direct current from the tether; wherein the tethered remote is devoid of alternating current, wherein the tethered remote comprises a pushbutton; wherein the pushbutton selects a preferred brightness level and a state of at least one connected light;

wherein the integrated timer may be user controlled from at least two different input locations connected physically and electrically by the tether, the two different input locations include: the input keypad located within the timer housing, and the tethered remote; wherein the tethered remote is devoid of the integrated timer or any timer; and a user may move the physical location of the tethered remote without removing the timer housing from a wall mounted electrical outlet, examples but not limitations include repositioning the tethered remote from a nightstand, to a bedroom floor, to a bed frame, to a footboard, or to a headboard of a bed; and a dimming circuit unit for reducing the voltage supplied from a power source.

9. The timer device as claimed in claim 8 further comprising:
a programmable lighting schedule;
the programmable lighting schedule may be preprogrammed or programmed by the user;
the programmable lighting schedule may be selected, adjusted, or reset by the pushbutton; and
the pushbutton may select the preferred brightness level and a state of at least one connected light within the programmable lighting schedule.

10. The timer device as claimed in claim 8 further comprising:
the pushbutton may be pressed to operate a countdown feature with customizable countdown times or a preset countdown time.

11. The timer device as claimed in claim 8 further comprising:
at least one LED indicator.

12. The timer device as claimed in claim 8 further comprising:
the tethered remote comprises at least one pushbutton which independently controls more than one load to more than one output, wherein two or more electrical devices plugged into two or more outlets of the timer may be controlled independently from each other.

13. The timer device as claimed in claim 8 further comprising:
a tether timer attachment, wherein the tether timer attachment facilitates the tether physical attachment to the timer, wherein the tether timer attachment structurally protects the tether upon entrance into the timer housing; and
a tether remote attachment, wherein the tether remote attachment facilitates the tether physical attachment to the tethered remote, wherein the tether remote attachment structurally protects the tether upon entrance into the tethered remote housing.

14. The timer device as claimed in claim 8 further comprising:
at least one USB output; and
the at least one USB output may be a USB or a USB-C output.

15. The timer device as claimed in claim 8 further comprising:
wireless control of home lighting devices; and
WiFi capabilities which allows the device to operate as a WiFi repeater or additional node to increase connectivity in a wireless system.

16. A timer device comprising:
a timer housing;
an AC-DC power supply which converts alternating current into direct current;
a microcontroller;
an integrated timer;
an input keypad;
a display;
a tether devoid of alternating current, which delivers direct current from the timer housing to a tethered remote, wherein the tether may vary in length, structure, and composition;
a tethered remote;
a tethered remote housing;
wherein the tethered remote receives direct current from the tether; wherein the tethered remote is devoid of alternating current; wherein the tethered remote comprises one or more pushbuttons; wherein the one or more pushbuttons control the state of at least one connected electrical device; wherein the one or more pushbuttons may be pressed to operate a countdown feature with customizable countdown times or a preset countdown time;
wherein the integrated timer may be user controlled from at least two different input locations connected physically and electrically by the tether, the two different input locations include: the input keypad located within the timer housing, and the tethered remote; wherein the tethered remote is devoid of the integrated timer or any timer; and
a user may move the physical location of the tethered remote without removing the timer housing from a wall mounted electrical outlet, examples but not limitations include repositioning the tethered remote from a nightstand, to a bedroom floor, to a bed frame, to a footboard, or to a headboard of a bed.

17. The timer device as claimed in claim 16 further comprising:
the tethered remote comprises at least one pushbutton which independently controls more than one load to more than one output, wherein two or more electrical devices plugged into two or more outlets of the timer may be controlled independently from each other.

18. The timer device as claimed in claim 16 further comprising:
a tether timer attachment, wherein the tether timer attachment facilitates the tether physical attachment to the timer, wherein the tether timer attachment structurally protects the tether upon entrance into the timer housing; and
a tether remote attachment, wherein the tether remote attachment facilitates the tether physical attachment to the tethered remote, wherein the tether remote attachment structurally protects the tether upon entrance into the tethered remote housing.

19. The timer device as claimed in claim 16 further comprising:
at least one USB output; and
the at least one USB output may be a USB or a USB-C output.

20. The timer device as claimed in claim 16 further comprising:
wireless control of home lighting devices; and
WiFi capabilities which allows the device to operate as a WiFi repeater or additional node to increase connectivity in a wireless system.

* * * * *